Nov. 2, 1943.   J. W. PRICE, JR   2,333,196
METALLIC PACKING RING FOR LOCOMOTIVE PISTON RODS AND THE LIKE
Filed Dec. 24, 1941
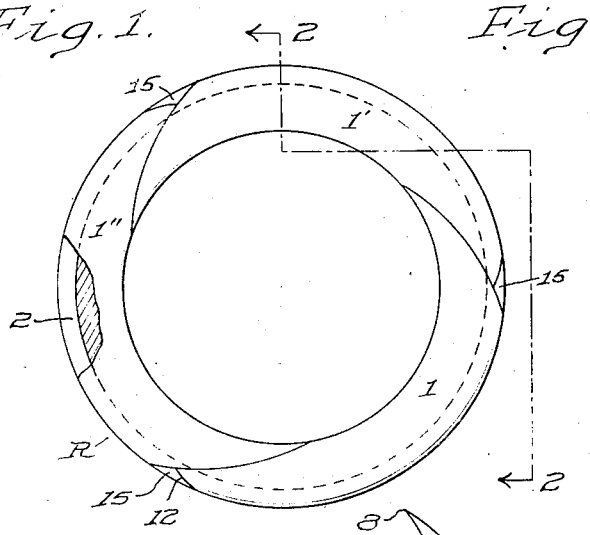
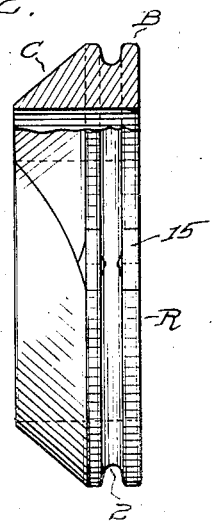
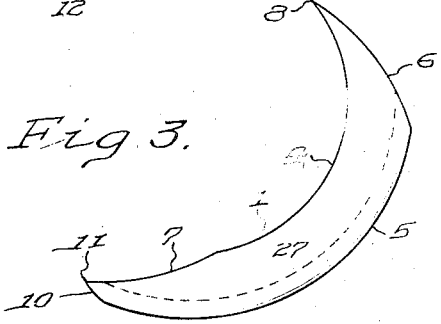
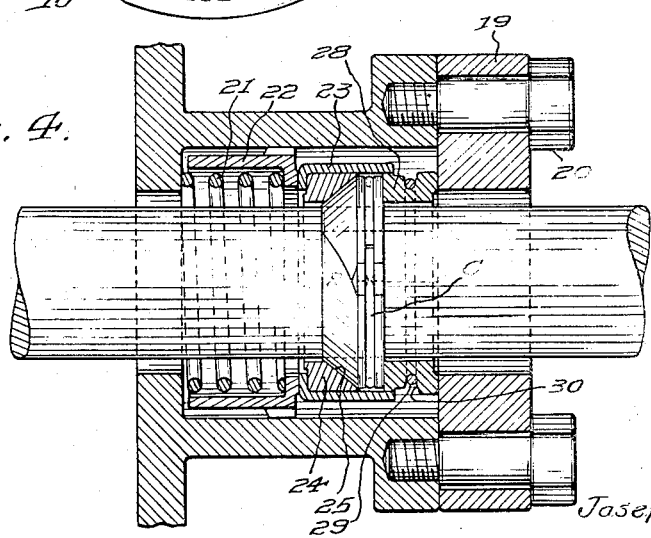
INVENTOR
Joseph W. Price Jr.
WITNESS Patented Nov. 2, 1943

2,333,196

UNITED STATES PATENT OFFICE 2,333,196

METALLIC PACKING RING FOR LOCOMOTIVE PISTON RODS AND THE LIKE

Joseph W. Price, Jr., Jenkintown, Pa., assignor to The United States Metallic Packing Company, Philadelphia, Pa., a corporation of Pennsylvania Application December 24, 1941, Serial No. 424,257

1 Claim. (Cl. 29—156.63)

This invention relates to metallic packing rings for piston rods or any generally comparable movable mechanical elements which pass through a stuffing box the purpose of which is to maintain a pressure differential on opposite sides or to confine a fluid such as steam on one side without interfering with the movement of the element. It is thus particularly directed to the provision of a novel metallic packing ring for steam engine stuffing boxes of that type in which a plurality of cooperative arcuate sections surround the piston rod to prevent the escape of steam from the engine cylinder.

Metallic packing rings of this general character have been in more or less general use for some time, one being illustrated and described in U. S. Letters Patent 1,452,159 issued April 17, 1923, to George C. Jerome. That ring, as will be evident from examination of the patent, is made in three sections each adapted to subtend a central angle at the ring axis of approximately 120° and the meeting faces of adjacent sections correspond to interfitting eccentric arcs and assist in keeping the stuffing box fluid and steam tight despite wear through use. Such packing rings are customarily shipped by the manufacturer with the several sections temporarily fastened together by solder between their adjacent ends to form in effect a solid annulus which is bored out accurately by the user to fit the rod to which it is to be applied and the solder is then melted out to separate the several sections and permit them to be placed about the rod in the stuffing box.

To obtain the requisite nicety of sliding fit between the interengaging portions of the ring sections it is essential that every trace of the solder by which they are temporarily held together to facilitate the boring be removed before the ring is assembled on the rod and this is a difficult and time-consuming operation which has constituted a serious objection to soldering the ring sections together in this way. Perhaps a more serious objection, however, resides in the fact that although the layers of solder between the sections are very thin, due allowance must be made when boring the ring to compensate for their subsequent removal and consequent constriction of the inner diameter of the ring when assembled as a whole. Not only is it difficult to theoretically determine in advance just what this allowance should be, since it is impossible to accurately measure the thickness of the solder layers, but even if a theoretical determination be reached and the ring bored in accordance therewith, that is, to a greater diameter than the diameter of the rod, the main sections even then will not accurately fit the rod but will form "crown" bearings thereon, as they were actually bored on a slightly larger radius than that of the rod, and thus permit a certain amount of leakage past the ring. On the other hand, if the ring when soldered together is bored smaller than or to the exact diameter of the rod, leakage will occur between the ends of the sections when they are assembled on the rod after the solder is removed. Yet in spite of these considerations it is essential that the ring sections be initially held rigidly together in some way so the ring can be properly chucked and bored as a whole.

It is therefore a primary object of my invention to provide a novel manner of uniting the ring sections with solder in such a way that while they are suitably held together for boring there is no necessity for making any allowance for subsequent change of bore diameter as the removal of the solder after boring in no way changes the size of the ring as a whole and, moreover, can be very readily and quickly effected so as to separate the sections preparatory to assembling them upon the rod.

Other objects, purposes and advantages of the invention will more fully appear from the following description of an embodiment illustrated in the accompanying drawing in which Fig. 1 is an axial elevation of a packing ring constructed in accordance with the invention;

Fig. 2 is a side elevation thereof partly in radial section on line 2—2 in Fig. 1;

Fig. 3 is a view corresponding to Fig. 1 but showing only one of the several sections comprised in the ring illustrated in that figure;

Fig. 4 is a sectional view on a smaller scale of a steam engine cylinder stuffing box including the packing ring illustrated in the preceding figures.

In the several figures like characters are used to designate the same parts.

Referring now more particularly to the drawing, it will be understood that while Figs. 1 and 2 illustrate the ring as it may appear prior to final boring to fit the piston rod and Figs. 3 and 4 are more intimately related to its condition after boring, I have not attempted to illustrate the effect of the latter which normally involves the removal of only a very small amount of metal from the inner surface of the annulus. Thus, the ring R, made of a suitable relatively soft metal such as a copper-tin mixture, bronze, brass or the like, as illustrated in the drawing comprises a plurality of identical sections as for example 1, 1', 1'' which when assembled together form a ring having a generally cylindrical base portion B and an inwardly tapering or conical portion C the base portion being preferably grooved as at 2 for the reception of the usual garter spring G which assists in holding the sections on the rod when assembled thereon. As best shown in Fig. 3, each section has inner and outer coaxial surfaces 4 and 5, a convex outer end surface 6 and a concave inner end surface 7 adapted to engage the convex outer end surface of the adjacent section, the intersection of the convex end surface 6 and inner peripheral surface 4 forming a feather edge 8. Up to this point, therefore, the ring is of generally similar construction to that shown in the aforesaid Jerome patent, 1,452,159, and requires no further description. Instead, however, as in that ring, of the outer peripheral surface 5 of the section being extended on its normal arc until it intersects the concave inner end surface 7 in a feather edge substantially the reverse of that at the other end of the section, in accordance with my invention the said outer surface is quite sharply rounded off as at 10 for a short distance rearwardly of its extremity so that a rather blunt point 11 is formed by its intersection with the adjacent concave inner end surface, with the result that when the sections are assembled a relatively shallow groove or depression 12 extending axially across the ring as a whole is formed between each of the rounded off surfaces 10 and the outer portion of the convex end surface of the abutting section and, again in accordance with the invention, these grooves are filled with solder or like fusible material 15 at the time the ring is manufactured so as to hold the sections temporarily but firmly together.

It will be observed that no solder whatever is introduced between the overlapping portions of the sections and the latter inter-fit exactly as they are intended to do when the ring is positioned on the rod. On the other hand, the solder 15 in the grooves 12 holds the sections in proper relation as a unit so the ring as a whole can be readily chucked and bored out to fit the rod without having to make any allowance whatsoever for its constriction after the solder is removed. The solder removal operation, moreover, is very readily accomplished after the ring has been bored off with a blow torch and it is only essential to see that no traces of it remain on that very small portion of the outer extremities of the surfaces 5 of the sections to which it was previously adherent; the fact that some trace of it may remain on the rounded surfaces 10 of the segments is, of course, immaterial since under no conditions do these surfaces inter-fit with or have any sliding action with respect to any other surfaces.

Fig. 4 shows the ring of my invention assembled in a stuffing box of a usual construction frequently employed with locomotive piston rods and brief reference thereto may not be out of place.

The ring and other parts in the stuffing box are held therein by a gland 19 secured to the box shell by cap screws 20, and said other parts include a compression spring 21 engaging the cylinder head at one end and receiving an annular preventer 22 on its other end to insure proper alignment of the spring. The preventer is held in place by contact with a retainer shell 23 which provides a receptacle for the packing ring and for retainer shell half pieces 24 which present a concave conical surface 25 bearing against the convex conical portion C of the ring and making a steam-tight joint with it. The sections of the ring, yieldingly held together about the rod by garter spring G in the grooves 2, bear with their outer flat end faces 27 normal to the ring axis against a split sliding plate 28 which is thus embraced between the packing ring and the gland 19 and is held in assembled relation about the rod by another garter spring 29 lying in a circumferential groove 30 in the plate.

From the foregoing description it will be evident that my packing ring is fitted about the piston rod partly within the retainer half pieces and in tight engagement with the split sliding plate and forms therewith a completely steam-tight joint at the stuffing box, and that it affords great facility for being accurately fitted to the rod while being capable, through relative axial and circumferential movement in the retainer half pieces, of automatically taking up wear of either the ring or the rod to preserve the impermeableness of the joint throughout a long period.

While I have shown and described one embodiment of the invention which I consider particularly suited to use for packing steam locomotive piston rod stuffing boxes, it will be appreciated that changes may be made in the form, construction and arrangement of its several parts, in their relation to each other and/or to other parts of the mechanism with which they are associated; that packing rings embodying the invention are well suited to use with other reciprocating rods than those used in steam engines and that these and other changes and modifications in the practice or utilization of the invention will consequently readily occur to those skilled in the art and may be made if desired without departing from its spirit and scope as defined in the appended claim.

Having thus described my invention, I claim and desire to protect by Letters Patent of the United States:

As an article of manufacture adapted for production of a metallic packing ring of the character described, a blank comprising a plurality of substantially identical interfitting sections having end surfaces in contact throughout their areas and adapted to slide on each other when the ring is assembled about a piston rod to thereby close the ring about the latter, one extremity of each section being rounded off and defining with the proximate outer end surface on the adjacent section a groove extending across the outer periphery of the ring, and metal of a lower melting point than the metal of the sections in each groove and completely confined to the same and joining the sections together, the size of the groove and the area of the walls thereof being sufficient to rigidly hold the sections temporarily in assembled relation sufficiently to enable the assembled sections to be chucked and bored to a diameter to fit accurately the rod preparatory to assembly of the sections thereon after removal of said metal.

JOSEPH W. PRICE, Jr.